(12) United States Patent
Ohira et al.

(10) Patent No.: US 6,810,179 B2
(45) Date of Patent: Oct. 26, 2004

(54) VARIABLE DISPERSION COMPENSATOR

(75) Inventors: Takuya Ohira, Tokyo (JP); Sadayuki Matsumoto, Tokyo (JP); Kiichi Yoshiara, Tokyo (JP); Masakazu Takabayashi, Tokyo (JP); Junichiro Hoshizaki, Tokyo (JP); Shigeru Matsuno, Tokyo (JP); Ryosuke Namiki, Tokyo (JP); Takashi Hashimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 128 days.

(21) Appl. No.: 10/305,157

(22) Filed: Nov. 27, 2002

(65) Prior Publication Data

US 2003/0228103 A1 Dec. 11, 2003

(30) Foreign Application Priority Data

Jun. 6, 2002 (JP) ........................... 2002-165967

(51) Int. Cl.[7] .............. G02B 6/34; H04J 14/08
(52) U.S. Cl. .............. 385/37; 385/11; 385/40; 385/41; 385/14; 398/81; 398/87
(58) Field of Search ............... 385/31, 37, 49, 385/24, 14, 129, 130, 40, 41, 11; 398/81, 87

(56) References Cited

U.S. PATENT DOCUMENTS 6,044,189 A * 3/2000 Miller ...................... 385/37
6,370,300 B1   4/2002 Eggleton et al. .......... 385/37 X
6,453,095 B2 * 9/2002 Feng et al. ................. 385/37
6,643,430 B2 * 11/2003 Matsumoto et al. ......... 385/37
6,728,443 B2 * 4/2004 Chowdhury et al. ......... 385/37
2003/0108268 A1 * 6/2003 Hashimoto et al. .......... 385/12
2003/0228103 A1 * 12/2003 Ohira et al. ................ 385/37

FOREIGN PATENT DOCUMENTS

JP         2000-244394      9/2000 ............... 385/37

OTHER PUBLICATIONS

Matsumoto et al., "Tunable Dispersion Equalizer with a Divided Thin–Film Heater for 40–Gb/s RZ Transmissions", IEEE Photonics Technology Letters, vol. 13, No. 8, pp. 827–829, Aug. 2001.

Eggleton et al., "Journal of Lightwave Technology", vol. 18, No. 10, pp. 1418–1432, Oct. 2000.

* cited by examiner

*Primary Examiner*—Brian M. Healy
(74) *Attorney, Agent, or Firm*—Leydig, Voit & Mayer, Ltd.

(57) ABSTRACT

A variable dispersion compensator includes an optical waveguide, a temperature controller. The optical waveguide has a chirped grating having a Bragg wavelength changing along the longitudinal direction of the grating. A temperature distribution $T_1(x)$ is applied to a central portion of the grating, defined as a region where a distance x from an end of the grating is a range of 20 % to 80 % of total length of the grating. Temperature distribution $T_2(x)$ and $T_3(x)$ are applied to end portions of the grating, defined as two regions extending from respective ends of the grating to the central region, respectively. At least one of $T_2(x)$ and $T_3(x)$ has a distance dependence different from that of the $T_1(x)$.

14 Claims, 12 Drawing Sheets

VARIABLE DISPERSION COMPENSATOR

BACKGROUND OF THE INVENTION

1. Field of the Invention

The present invention relates to dispersion compensating technique in a ultra-high-speed optical communication system and, more particularly, to a variable dispersion compensator having a chirped grating for changing chirp rate to control group delay time.

2. Description of the Background Art

In an optical communication system using an optical fiber cable as a signal transmission path, a signal is distorted, since an optical pulse is distorted by wavelength dispersion (hereinafter referred to as "dispersion") of the optical fiber transmission path. This is because group velocity is different between wave packets of optical pulses having different wavelengths from each other. That is the group delay time, i.e., time required for a wave packet of an optical pulse to propagate a predetermined length. Ratio of the group delay time to a wavelength is defined as dispersion. In a single-mode fiber (SMF) used as a general optical fiber transmission path, dispersion per 1-km optical fiber transmission path at wavelength of about 1,550 nm has a value of about 16 ps/(nm·km). This means that difference in a single-mode fiber of length of 1 km is 16 ps between group delay times required for propagating optical pulses having wavelengths different by 1 nm. For example, difference between group delay times is 100 times the above difference, i.e., 1,600 ps, when optical pulses having wavelengths different by 1 nm propagate in an optical fiber having a length of 100 km.

On the other hand, a modulated optical pulse has a spread of line spectra determined by modulation method and bit rate, and its envelope is of a Gaussian distribution type. For example, in return-to-zero (hereinafter referred to as RZ) modulation method, an interval between respective line spectra is 0.08 nm when bit rate (transmission rate) is 10 Gbit/s. The interval is 0.32 nm when the bit rate is 40 Gbit/s. More specifically, the spread of line spectra increases in proportion to the bit rate. Non-return-to-zero (hereinafter referred to as NRZ) modulation method obtains a spread of line spectra which is half the spread of line spectra obtained in the RZ modulation. In this manner, the interval of line spectra which are components of an optical pulse increases as the bit rate increases. For this reason, a difference between group delay times obtained increases, and distortion of the optical pulses increases, when optical pulses are propagated in an optical fiber transmission path. An influence of dispersion of an optical fiber transmission path on an optical pulse increases in proportion to the square of bit rate. In dispersion compensation technique, a device having dispersion which cancels dispersion in an optical fiber transmission path is inserted into the transmission path to approximate the whole dispersion to zero. In particular, the dispersion of a transmission path must be accurately approximated to zero at bit rate of 40 Gbit/s or more.

A variable dispersion compensator using a chirped grating is known as a device which compensates dispersion. For example, such a variable dispersion compensator was proposed by the present inventors in IEEE PHOTONICS TECHNOLOGY LETTERS, VOL. 13, NO. 8, pp. 827 to 829 (issued in August, 2001). In this variable dispersion compensator, chirped gratings are arranged on 32 thin film heaters, the temperatures of the 32 thin film heaters are independently controlled to apply linear temperature gradient to the chirped grating, thereby making the dispersion of the chirped gratings variable. The present inventors set temperature gradient which linearly is changed from 0° C. to 60° C. to realize a variable dispersion equalizer having dispersion variable width of 100 ps/nm or more, so that optical signal transmission at 40 Gbit/s is performed. In addition, a chirped grating having a grating length of 40 mm is used.

As described above, a variable dispersion compensator which applies a temperature distribution changing on the basis of a predetermined function to a chirped grating and controls the temperature distribution to control group delay time is useful as a device which can easily variably control dispersion. In the above variable dispersion compensator, the temperature is linearly changed, and the temperature distribution, in which temperature difference between the maximum temperature and the minimum temperature is 60° C., is applied to an whole grating, so that a dispersion variable width of 100 ps/nm is realized.

However, when the temperature distribution based on the same temperature distribution function is applied to the whole chirped grating, power consumption disadvantageously increases.

SUMMARY OF THE INVENTION

It is, therefore, an object of the present invention to provide a variable dispersion compensator which reduce a power consumption while suppressing deterioration of optical signal characteristics.

In accordance with one aspect of the present invention, there is provided a variable dispersion compensator including an optical waveguide, a temperature controller. The optical waveguide has a chirped grating having Bragg wavelength changed along a longitudinal direction of the grating. The temperature controller controls temperature of the chirped grating. Then, temperature distribution based on a first function $T_1(x)$ of the distance x is applied to a central portion of the grating. The central portion is defined as a region where a distance x from an end of the grating is a range of 20% to 80% of total length of the grating along the longitudinal direction thereof. Temperature distribution based on second and third functions $T_2(x)$ and $T_3(x)$ of the distance x are applied to both end portions of the grating. The both end portions are defined as two regions respectively extending from both ends of the grating to the central region, respectively. At least one of the second and third functions $T_2(x)$ and $T_3(x)$ has distance dependence different from that of the first function $T_1(x)$.

In another aspect of the present invention, there is provided a polarization mode dispersion compensator including a polarized wave separator/synthesizer, a first optical waveguide, a first temperature controller, a second optical waveguide, and a second temperature controller. The polarized wave separator/synthesizer separates light into first and second polarized light components serving as two linear polarized light components, and synthesizes the first and second polarized light components. The first optical waveguide has a first chirped grating which receives the first polarized light component as an input light component and in which Bragg wavelength is changed along a longitudinal direction of the grating. The first temperature controller controls temperature of the first chirped grating. The second optical waveguide has a second chirped grating which receives the second polarized light component as input light component and in which Bragg wavelength is changed along the longitudinal direction of the grating. The second temperature controller controls temperature of the second chirped grating. Temperature distribution based on the first and second functions $T_1(x)$ and $T_2(x)$ of the distance x are applied to central portions of the first and second gratings defined as a regions where distance x from an end of the first and second grating is a range of 20% to 80% of length of the first and second grating along the longitudinal direction thereof, respectively. The second function $T_2(x)$ has distance dependence different from that of the $T_1(x)$.

According to the present invention, the temperature at the end portion on the high temperature side can be controlled to a lower temperature. In this case, eye opening penalty which is almost equal to that obtained when temperature distribution based on the same temperature distribution function is applied to the whole region of the grating can be obtained. For this reason, power consumption can be reduced without changing eye opening penalty.

BRIEF DESCRIPTION OF THE DRAWINGS

The present invention will become readily understood from the following description of preferred embodiments thereof made with reference to the accompanying drawings, in which like parts are designated by like reference numeral and in which.

DETAILED DESCRIPTION OF PREFERRED EMBODIMENTS

Figure 1A:
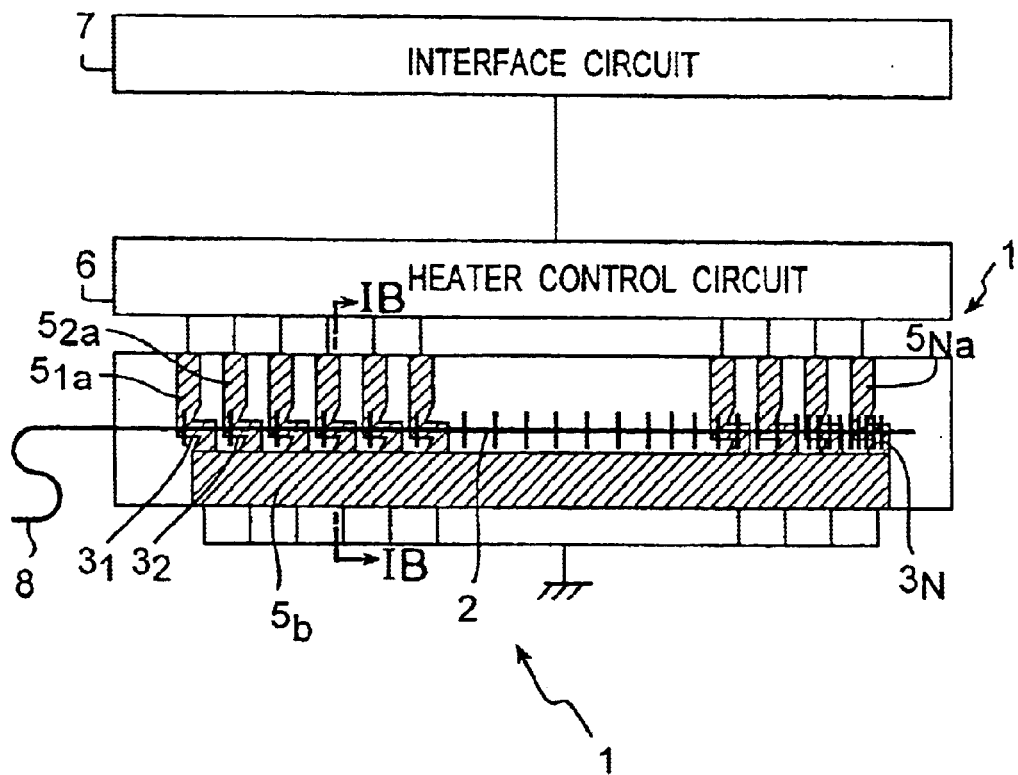
FIG. 1A is a schematic view of the configuration of a variable dispersion compensator according to the first embodiment of the present invention.

Embodiments of the present invention will be described hereinafter with reference to the drawings. In the drawings, the same reference characters indicate the same or corresponding components.

Figure 1B:
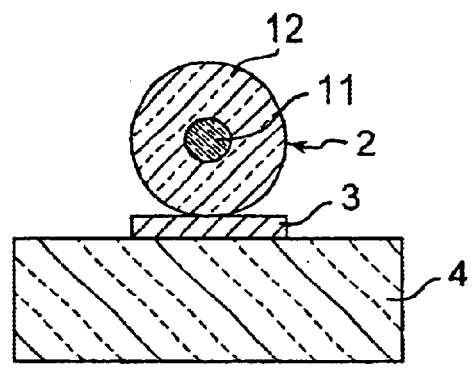
FIG. 1B is a sectional view along 1B—1B line in FIG. 1A.

A variable dispersion compensator according to a first embodiment of the present invention will be described below with reference to FIGS. 1 to 7. FIG. 1A is a schematic view of the configuration of the variable dispersion compensator. FIG. 1B is a sectional view along an 1B—1B line in FIG. 1A. This variable dispersion compensator 1, as shown in FIG. 1, includes an optical waveguide 8 having a chirped grating 2 and temperature controllers 3, 5, 6, and 7 that controls temperature of the chirped grating 2.

Figure 5:
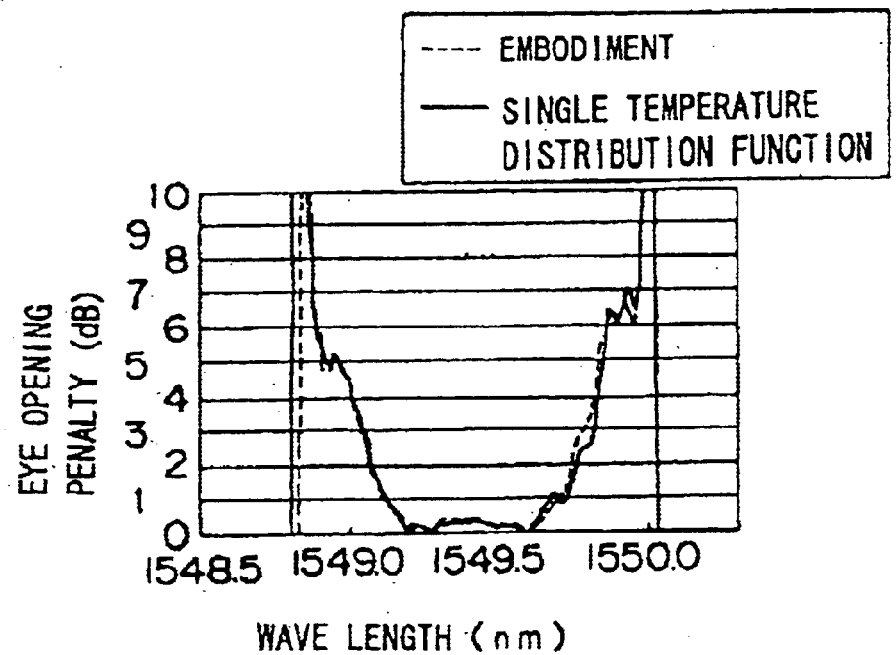
FIG. 5 is a graph of eye opening penalty produced when the variable dispersion compensator according to the first embodiment of the present invention is applied to an optical signal NRZ-modulated at 43 Gbit/s provided with the temperature distribution in FIG. 4.

In this variable dispersion compensator 1, temperature distribution based on first temperature distribution function $T_1(x)$ of the distance x is applied to a central portion. The central portion is defined as a region where a distance x from one end of the chirped grating 2 is a range from 20% to 80% of a length L of the chirped grating 2. Hereinafter, the first temperature distribution function is referred to as first function. Temperature distribution based on third temperature distribution function (hereinafter referred to as third function) $T_3(x)$ is applied to an end portion extending from the other end of the chirped grating 2 and having a distance which is not more than 20% of the length L. The third function $T_3(x)$ has distance dependence different from that of the first function $T_1(x)$. For example, as in temperature distribution indicated by a solid line in FIG. 4, temperature may be controlled to a lower temperature at an end portion on the high temperature side. In this case, for example, eye opening penalty of optical signal characteristics can be suppressed to a level equal to the level of eye opening penalty obtained when temperature distribution based on the same temperature distribution function is applied to the whole region of the chirped grating 2 as shown in FIG. 5. In this manner, the eye opening penalty can be suppressed from being deteriorated, and a power consumption can be suppressed.

This variable dispersion compensator has a characteristic feature that temperature distribution functions having distance dependence different from each other are respectively applied to the central portion and the both end portions of the chirped grating. The present inventors thought up this characteristic feature from the following knowledge. An allowable range of optical signal characteristic deterioration has a predetermined width, when an optical signal passes through the variable dispersion compensator. For example, in consideration of that only about 1 dB may be assured as eye opening penalty serving as optical signal characteristics, it is considered that only temperature distribution function $T_1(x)$ is not always necessarily applied to the whole chirped grating. Therefore, the present inventors thought up the variable dispersion compensator.

The configuration of an optical waveguide 8, which has the chirped grating 2 constituting the variable dispersion compensator 1, will be described below. The optical waveguide 8, as shown in the sectional view in FIG. 1B, is an optical fiber constituted by a core 11 and a clad 12 which covers the core 11. As shown in FIG. 1A, the chirped grating 2 having the grating pitch that is linearly changed in the longitudinal direction of the grating is formed. The optical waveguide 8 is arranged on a substrate 4 having low heat conductivity. As the substrate 4 having low heat conductivity, for example, a substrate consisting of ceramics such as quartz or glass or a resin such as polyimide can be used.

The configuration of the temperature controller of the variable dispersion compensator 1 will be described below. This temperature controller controls a plurality of heaters arranged near the chirped grating of the optical waveguide to change Bragg wavelength, thereby controlling dispersion of the chirped grating. More specifically, this temperature controller is constituted by a heater 3, an electrode 5, control circuits 6 and 7, and the like which make temperature distribution in the chirped grating. That is, the temperature controller, as shown in the block diagram in FIG. 1, is constituted by thin film heaters $3_1, 3_2, \ldots, 3_N$ arranged near the chirped grating, the heater control circuit 6 serving as a control unit for applying a control signal to the thin film heaters $3_1, 3_2, \ldots, 3_N$ through the electrode 5, and the interface circuit 7. Powers are independently applied to the thin film heaters $3_1, 3_2, \ldots, 3_N$ through the heater control circuit 6 on the basis of a control signal from the interface circuit 7, so that predetermined temperature distribution can be applied to the respective portions of the grating.

In addition, the details of respective constituent elements of the temperature controller will be described below. The thin film heaters $3_1, 3_2, \ldots, 3_N$ are arranged between an optical fiber 2a and the substrate 4. Electrode units $5_{1a}, 5_{2a}, \ldots, 5_{Na}$ of the respective heaters and a common electrode 5b commonly used for all the heaters are formed at both the ends of the thin film heaters $3_1, 3_2, \ldots, 3_N$. The electrode units $5_{1a}, 5_{2a}, \ldots, 5_{Na}$ and the common electrode 5b are formed by a thin film process simultaneously with the thin film heaters $3_1, 3_2, \ldots, 3_N$. The electrode units $5_{1a}, 5_{2a}, \ldots, 5_{Na}$ and the common electrode 5b is made of the same material as that of the thin film heaters, and are sufficiently increased in line width to decrease the resistances. Therefore, in each of the electrode units 5, an increase in temperature is vanishingly smaller than that of the thin film heater 3. When a metal thin film such as copper or silver having a high electric conductivity is formed on the upper part of the electrode units, the electrodes can be more increased in efficiency. The electrode units $5_{1a}, 5_{2a}, \ldots, 5_{Na}$ are connected to the heater control circuit 6 through lead lines. On the other hand, the common electrode 5b is connected to the ground (GND) by a lead line. The optical fiber 8 serving as an optical signal input unit is arranged at one end of the chirped grating 2. A protection member (not shown) for protecting the chirped grating 2 and aiding the adhesion to the thin film heater 3 may be formed on the chirped grating 2. The arrangements and operations of the heater control circuit 6, the interface circuit 7 and the like are not limited to the arrangements and the operations described above. For example, in the heater control circuit 6, a pulse voltage or current may be digitally applied in a time sharing manner without converting a control signal into an analog voltage or current by a D-A converter. Even though a planar lightwave circuit (hereinafter referred to as PLC) is used as the optical waveguide in place of an optical fiber, the same configuration may be employed.

Figure 2:
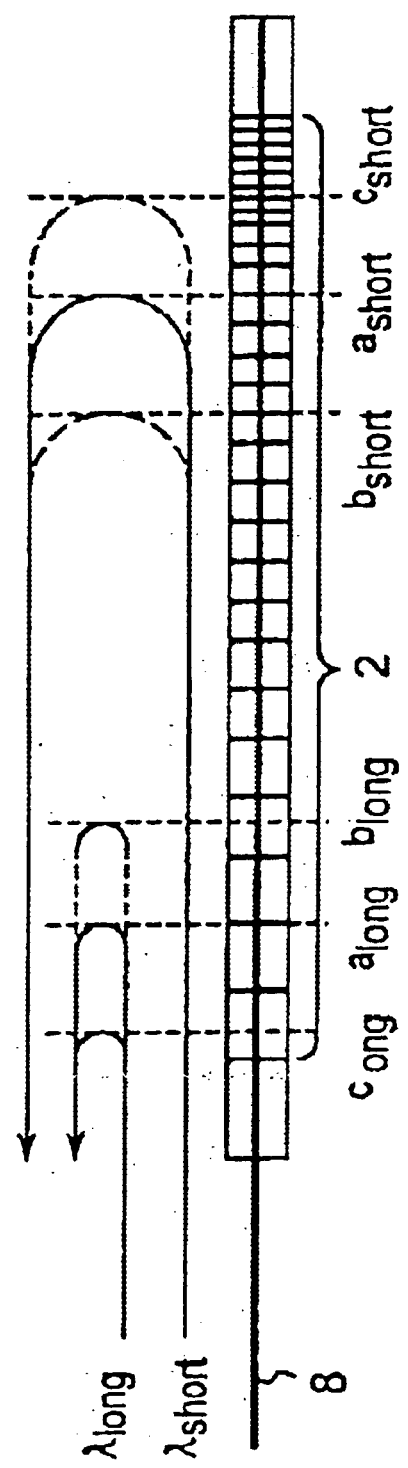
FIG. 2 is a schematic view of an operation of the variable dispersion compensator according to the first embodiment of the present invention.

An operation of the variable dispersion compensator will be described below with reference to FIGS. 2 and 3. FIG. 2 is a schematic view for explaining an operation of a variable dispersion compensator having a chirped grating. FIGS. 3A and 3B are graphs showing a relationship between temperature distribution and a group delay time, the temperature distribution is formed by a heater of a temperature controller constituting the variable dispersion compensator. A light having a wavelength $\lambda_B$ and input from the optical waveguide 8 is reflected when a grating pitch $\Lambda$ of the chirped grating and an equivalent refractive index Neff satisfy the following equation (1):

$$\lambda_B = 2 \cdot N\text{eff} \cdot \Lambda. \tag{1}$$

Therefore, as shown in FIG. 2, a manner of reflecting a light input to the chirped grating 2 having a grating pitch which is large on an input/output side and which becomes dense toward the right from the input/output side will be considered. In this case, a light $\lambda_{long}$ having a long wavelength is reflected at a position $a_{long}$ close to the input/output side. On the other hand, a light $\lambda_{short}$ having a short wavelength is reflected at a position $a_{short}$ distant from the input/output side. For this reason, since the light $\lambda_{short}$ having a short wavelength is propagated for a distance longer than that of the light $\lambda_{long}$ having a long wavelength, the group delay time of the light $\lambda_{short}$ becomes long. In this manner, the group delay time changes depending on the wavelength, a prescribed dispersion can be obtained. Dispersion having a sign opposing the sign of the optical fiber transmission path is applied to the transmission path, so that dispersion compensation can be performed.

However, since the dispersion of the optical fiber transmission path changes depending on a peripheral environment such as a distance or temperature, the dispersion of the variable dispersion compensator must be changed depending on the dispersion of the optical fiber transmission path. For this purpose, temperature distribution is applied to the grating to change the equivalent refractive index Neff and to change positions where lights having the respective wavelengths are reflected, thereby making the dispersion variable. An example in which the dispersion of the variable dispersion compensator is changed is shown in FIGS. 3A and 3B. Temperature distribution depending on grating positions is shown in FIG. 3A, and a relationship between the wavelength and group delay time is shown in FIG. 3B. As described above, dispersion may be changed depending on temperature distribution applied to the grating by the heater arranged near the grating.

Figure 3A:
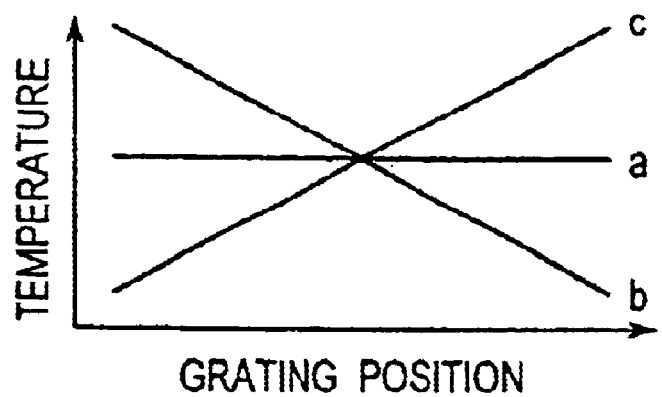
FIG. 3A is a graph of temperature distribution by a heater of the variable dispersion compensator according to the first embodiment of the present invention.

More specifically, in the graph of temperature distribution depending on a grating position in FIG. 3A, a straight line is obtained when the temperatures of the thin film heaters $3_1$, $3_2$, ..., $3_N$ are constant and when the equivalent refractive index Neff of the chirped grating is constant in the longitudinal direction of the grating. In this case, as in the case in which temperature control is not performed as described above, the wavelength of a light reflected by the chirped grating is in proportion to a grating pitch Λ. Therefore, since the light $λ_{short}$ having a short wavelength propagates for a distance longer than that of the light $λ_{long}$ having a long wavelength, the group delay time becomes long. A relationship between the group delay time and the wavelength is indicated by the straight line a shown in FIG. 3B. When temperature distribution of the heater 3 is set to high on a side close to an input/output side and set to low on a side distant from the input/output side as indicated by a straight line b in FIG. 3B, the equivalent refractive index on the side close to the input/output side increases, and the equivalent refractive index on the side distant from the input/output side decreases. Therefore, the light $λ_{long}$ having the long wavelength is reflected at a place $b_{long}$ as shown in FIG. 2. On the other hand, the light $λ_{short}$ having the short wavelength is reflected at a place $b_{short}$, and the relationship between the group delay time and the wavelength is applied by the straight line b in FIG. 3B. Similarly, when the temperature distribution of the heater 3 is applied by a straight line c in FIG. 3A, the relationship between the group delay time of the wavelength has a large inclination as indicated by a straight line c in FIG. 3A. Since the dispersion is the inclination of the group delay time, i.e., a wavelength differentiation of the group delay time, the dispersion can be made variable by changing the temperature distribution of the heater as described above.

Figure 3B:
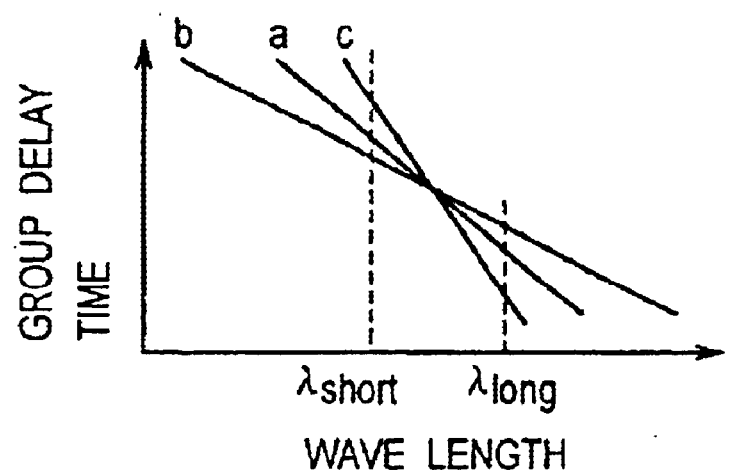
FIG. 3B is a graph of relationship between a group delay time and a wavelength in case of FIG. 3A.
Figure 4:
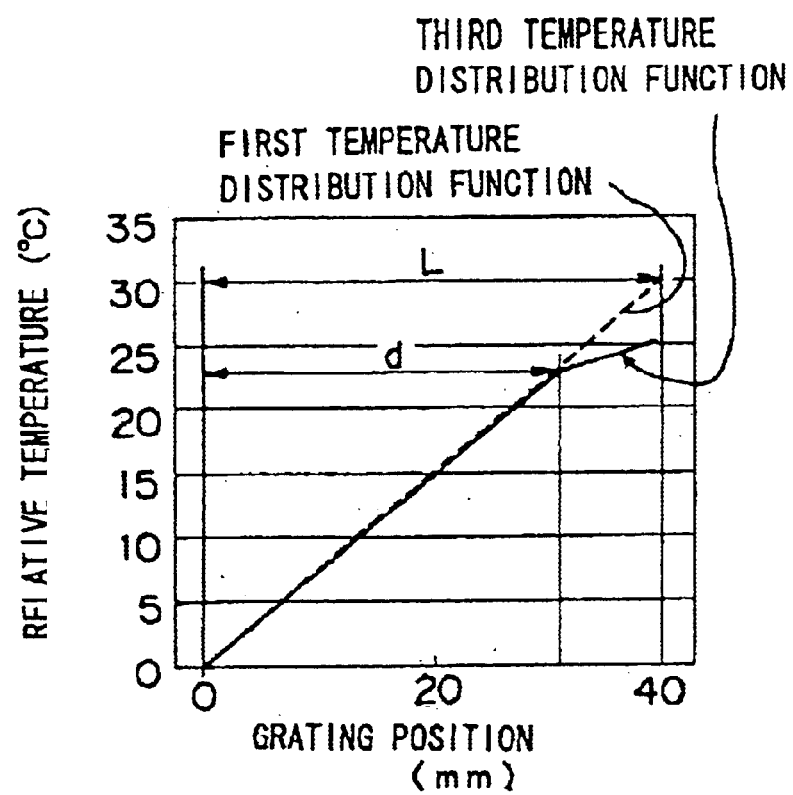
FIG. 4 is a graph of temperature distribution applied to a chirped grating by a temperature controller of the variable dispersion compensator according to the first embodiment of the present invention.

More specifically, the wavelength dependency of the group delay time in FIG. 3B linearly changes with respect to the wavelength λ as shown in Equation (2):

$$\text{group delay time} = Aλ+B, \quad (2)$$

wherein A and B are arbitrary,
when temperature inclination is not applied as indicated by the straight line a in FIG. 3A. This inclination A is dispersion value. In order to change this dispersion value A as indicated by the straight lines b and c in FIG. 3B, temperature distribution b and c shown in FIG. 3A are applied to the whole grating. For example, temperature distribution function T(x) is shown by the following Equation (3):

$$T(x)=Cx+D, \quad (3)$$

wherein C and D are arbitrary constant.
T(x) may be changed by C and D. For this reason, temperature distribution obtained by the temperature distribution function T(x) having desired C and D is applied to the whole grating to change the wavelength dependency of the group delay time. In this manner, the dispersion value A can be controlled.

In the variable dispersion compensator 1, temperature distribution, in which temperature is changed as a linear function of the distance x, is applied at a central portion in which a distance x from one end of the chirped grating is defined within the range of 20% to 80% of the length L of the chirped grating. The linear function is Equation (4):

$$T_1(x)=0.75x+D. \quad (4)$$

On the other hand, of both the end portions defined as regions extending from both ends of the chirped grating 2 and having lengths not more than 20% of the length L of the grating, at the end portion on the high temperature side, temperature distribution having temperature lower than that based on the Equation (4). In this case, the temperature on the high temperature side is shifted to the low temperature side by up to 5° C. More specifically, the temperature distribution based on the same linear function expressed by the Equation (4) is applied to the region the length of which is 80% of the length of chirped grating. Eye opening penalty obtained in this case is almost equal to the eye opening penalty obtained when the only temperature distribution function $T_1(x)$ is applied to the whole region of grating, as shown in FIG. 5. In this case, the eye opening penalty of about 1 dB or less can be obtained.

FIG. 5 shows eye opening penalty obtained when an optical signal NRZ-modulated at a rate of 43 Gbit/s by using the variable dispersion compensator. The eye opening penalty is one of methods of evaluating qualities of optical signals after transmission, and is measured as an aperture of an eye pattern. Small eye opening penalty represents that the transmitted optical signal is not deteriorated. In FIG. 5, a solid line represents a case in which temperature distribution having linearly temperature change is applied to the whole region of a conventional chirped grating along the longitudinal direction. Eye opening penalty obtained when temperature distribution based on the same linear function $T_1(x)$ is applied to at least the central portion of the chirped grating by the temperature controller of the variable dispersion compensator and temperature distribution shifted from the linear function $T_1(x)$ is applied to at least one of both the end portions is indicated by a dotted line. When the eye opening penalties are compared with each other in FIG. 5, it is found that the eye opening penalties obtained by both the different temperature distributions are almost the same as each other.

Figure 6:
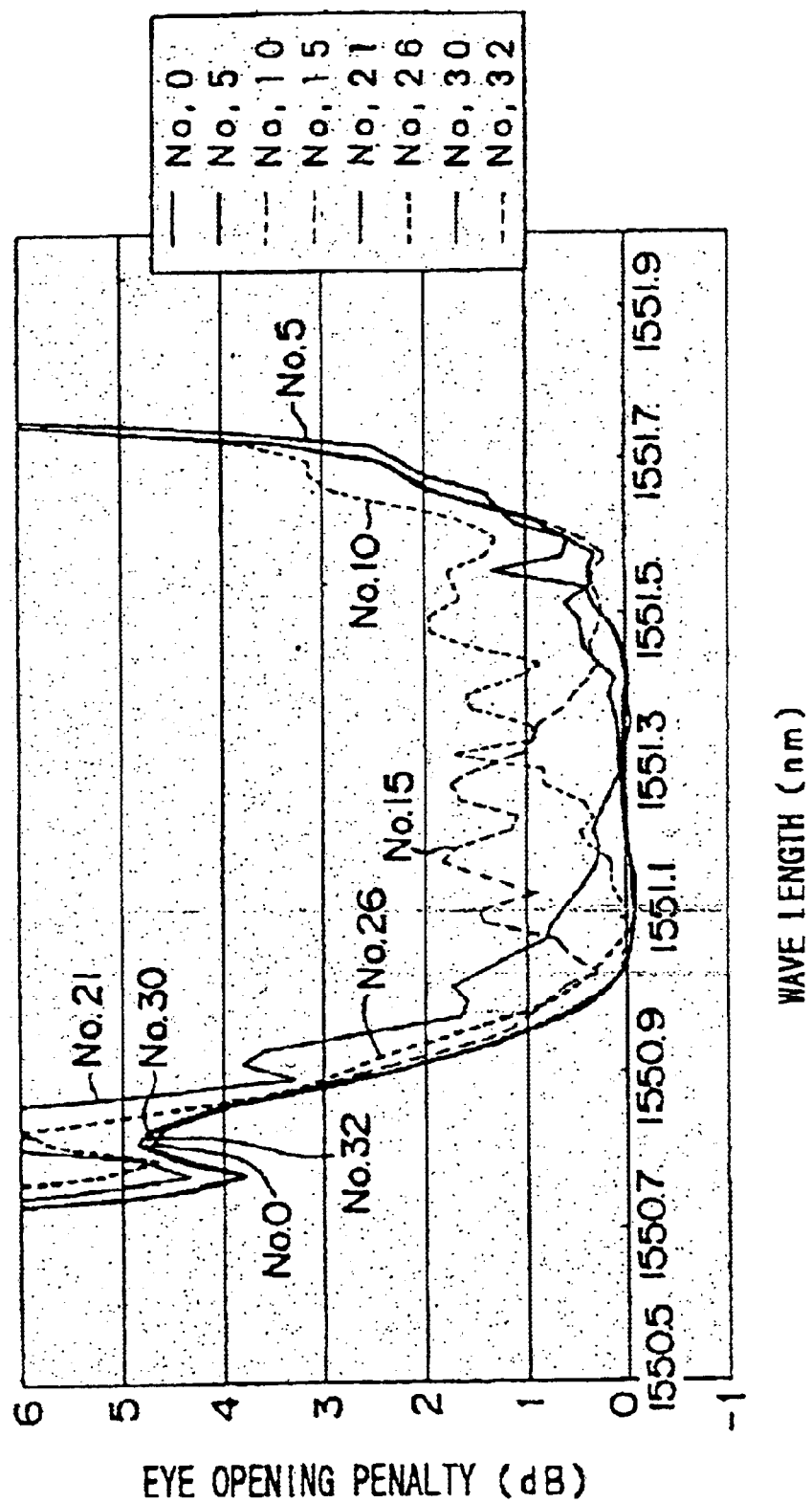
FIG. 6 is a graph of relationship between eye opening penalty and wavelength, the eye opening penalty produced when a number of heaters of a plurality of heaters of the variable dispersion compensator according to the first embodiment of the present invention are shifted 5° C. higher from setting temperatures.

In addition, a region of the chirped grating 2 to which temperature distribution based on the same temperature distribution function $T_1(x)$ will be described below with reference to FIG. 6. FIG. 6 is a graph showing a wavelength dependency of eye opening penalty obtained when only one of the plurality of heaters 3 of the variable dispersion compensator shown in FIG. 1 is set at temperature higher than the temperature of the other heaters by about 5° C. In the variable dispersion compensator, the chirped grating 2 is equally divided into 32 parts from one end to the other end, and a total of 33 heaters $3_1$, $3_2$, ..., $3_{32}$ to which numbers No. 0 to No. 32 are sequentially assigned are arranged on the respective parts. FIG. 6 shows a wavelength dependency of eye opening penalty obtained when any one of the heaters No. 0, No. 5, No. 10, No. 15, No. 21, No. 26, No. 30, and No. 32 is set at temperature which is higher than the temperatures of the other heaters by about 5° C. As is apparent from FIG. 6, when the temperature of the heater 3 of No. 10, No. 15, or No. 21 is shifted from the temperature distribution function $T_1(x)$, the eye opening penalty is deteriorated in an almost whole region including the center wavelength. On the other hand, the eye opening penalty is rarely deteriorated with respect to the heaters 3 of No. 5 or No. 26. As is apparent from this result, temperature distributions based on the same temperature distribution are preferably applied by the heaters of No. 6 to No. 25. This region of the chirped grating is a region in which a distance from one end of the chirped grating is defined within the range of 20% to 80% of the length L of the grating. It is preferable that temperature distribution the temperatures of which change on the basis of the same linear function are applied to the region extending in the range of 60% to 90% of the length L. Even though the temperatures of both the end portions defined as regions extending from both the ends of the chirped grating 2 and having lengths which are not more than 20% of the length L are shifted from the linear temperature distribution of the central portion by a predetermined temperature range, the eye opening penalty can be suppressed to a low level. In addition, since the set temperature at the end portion on the high temperature side can be shifted to the low temperature side, the power consumption of the heaters can be reduced. Temperature distribution, in which temperature is linearly changed, is applied to a region having a length which is 80% of the length of grating except for the end portion on the high temperature side. Furthermore, the temperature of the region of the end portion on the low temperature side having the length which is 20% of the length of grating may be shifted from the temperature distribution.

Figure 7:
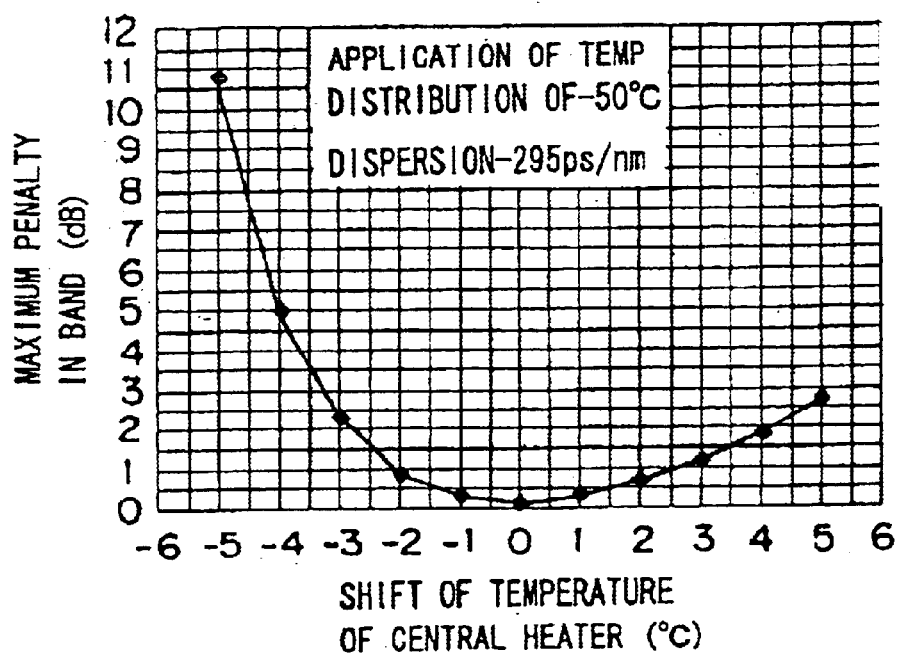
FIG. 7 is a graph of relationship between the maximum eye opening penalty in a band and shift temperature, the eye opening penalty obtained when temperature by central heater of the variable dispersion compensator according to the first embodiment of the present invention is shifted from the setting temperature.

An allowable range of temperature distribution based on the same temperature distribution function $T_1(x)$ will be described below. FIG. 7 is a graph showing a relationship between maximum eye opening penalty in a band and a shift of temperature when the set temperature of the central heater 3 (e.g., No. 16) of the 33 heaters 3 is shifted. As is apparent from FIG. 7, a shift of the temperature must be smaller than ±2.5° C. to suppress the eye opening penalty to about 1 dB or less.

When the region of the temperature distribution based on the same temperature distribution function $T_1(x)$ is narrower than the region having a length which is 60% of the length L of the chirped grating, the eye opening penalty is deteriorated as described above. When the temperature distribution based on the same temperature distribution function $T_1(x)$ are applied to a region having a length which is 90% or more of the length, an advantageous reduction in power consumption on the high temperature side is about 0.5% or less. For this reason, for example, since an advantageous reduction in power consumption obtained when a heater power is 2 W is only 0.01 W, and the reduction in power consumption can be neglected. Therefore, a region to which temperature distribution based on the same temperature distribution function $T_1(x)$ is applied is preferably set to a region having a length of 60% to 90% of the length of the grating.

Furthermore, in this time, the maximum shift amount is set to −5° C. However, when the maximum temperature difference is 60° C., even though a shift amount is 20% of the maximum temperature difference, i.e., ±12° C., the eye opening penalty can be suppressed from being deteriorated. When a shift amount which is less than ±2.5° C. is considered, an advantageous reduction in power consumption is about 1.3% and can be neglected at the maximum temperature inclination of 60° C. Therefore, as a temperature range shifted from the temperature distribution based on the linear function at both the end portions of the chirped grating, a range of ±2.5° C. to ±12° C. is preferably used.

In this case, temperature distribution having a predetermined inclination can be substantially applied to only the central portion of the chirped grating 2. Therefore, the temperature inclination at the central portion of the chirped grating 2 can be more increased, a variation in gradient of the group delay time can be increased. Although the case in which the temperature distribution applied to the chirped grating is controlled to change a group delay time has been described above, a method of changing a group delay time is not limited to the above method described above. For example, stress may be applied to the chirped grating 2 to change a group delay time. In this case, the stress may be applied to at least a central portion in which a distance from one end of the chirped grating 2 is defined within the range of 20% to 80% of the length L of the grating, i.e., a region having a length which is 60% of the length L. In addition, the region to which stress is applied is preferably the range of 60% to 90% of the length L. A group delay time may be changed by using an electro-optical effect to the chirped grating. In this case, when the electro-optical effect of the central portion extending in the range of 20% to 80% of the length of the grating is used, the same effect as described above can be obtained. Furthermore, the region in which the electro-optical effect is preferably a region having a length which falls within the range of 60% to 90% of the length.

Figure 8:
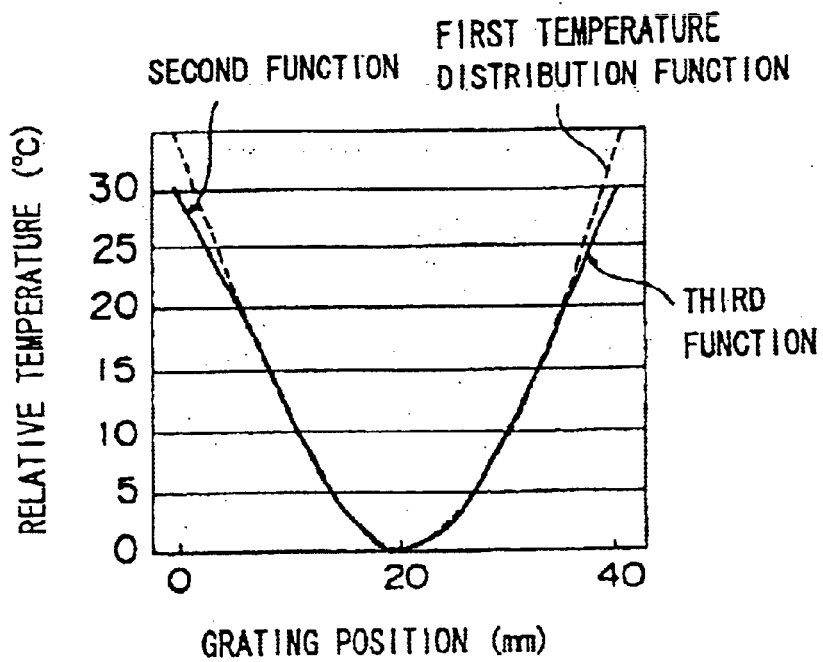
FIG. 8 is a graph of temperature distribution applied by a temperature controller of a variable dispersion compensator according to the second embodiment of the present invention.

A variable dispersion compensator according to the second embodiment of the present invention will be described below with reference to FIG. 8. FIG. 8 is a graph showing an example of temperature distribution applied to a chirped grating 2. A dotted line indicates first temperature distribution function $T_1(x)$ of a quadratic curve representing how temperature is changed as a quadratic function with reference to a grating position x. A solid line indicates temperature distribution applied to the chirped grating. Of the solid line, parts depart from the dotted line at both the end portions of the grating 2 indicates a second temperature distribution function $T_2(x)$ and a third temperature distribution function $T_3(x)$, respectively. Temperature distribution based on the temperature distribution function $T_1(x)$ is applied to the central portion of the grating, and temperature distribution based on the second and third functions $T_2(x)$ and $T_3(x)$ are applied to both the end portions. More specifically, this variable dispersion compensator can apply temperature distribution the temperature of which changes like a quadratic curve as shown in FIG. 8 to the chirped grating 2. In this manner, even though dispersion is a linear function with reference to a wavelength, the dispersion can be compensated.

A case in which dispersion is a linear function of wavelength will be described below. An optical pulse has a spread of several line spectra determined by bit rate. When the spread is small with reference to the dispersion characteristics of an optical fiber transmission path, only dispersion may be compensated. However, when the bit rate becomes high (the spread of line spectra increases in proportion to the increase in bit rate), and when the spread of the line spectra increases, the dispersion characteristics of the fiber must be compensated as a linear function. The inclination of the dispersion with reference to the wavelength is called dispersion slope. In this case, a technique that a device having dispersion slope which cancels the dispersion slope of the optical fiber transmission path is inserted into a transmission path to make the dispersion close to zero as a whole, i.e., dispersion slope compensation technique is necessary. In particular, at bit rate of 80 Gbit/s or more, the dispersion slope of the transmission path must be made accurately close to zero. When the dispersion is a linear function with reference to the wavelength, the group delay time is a quadratic function. For this reason, for example, at the central portion of the chirped grating 2, temperature distribution having the temperature of which change as a quadratic function of a distance x is shown on the basis of following Equation (5):

$$T_1(x)=E(x-L/2)^2+F \tag{5}$$

wherein E and F are arbitrary constant, and L is grating length, so that dispersion which is a linear function with respect to the wavelength can be compensated.

Concrete conditions of the temperature distribution in FIG. 8 will be described below. The first function $T_1(x)$ of quadratic curve is Equation (6):

$$T_1(x) = E(x - 40/2)^2, \quad (6)$$

wherein E is arbitrary constant,
which represents a relationship between a grating position x (mm) and a relative temperature $T_1(x)$ (° C.). In this case, the grating length L is 40 mm; E, −1.75; and $F_1$, 25. When the value E is controlled, dispersion slope can be controlled. Temperature distribution, in which the temperature is changed as a quadratic function, is applied to the central portion of the grating on the basis of the first function $T_1(x)$. Temperature distributions the temperatures of which are lower than the temperature based on the first function $T_1(x)$ by a maximum of 5° C. are applied to both the end portions of the grating. Even though the temperature distributions are used, the eye opening penalty is rarely deteriorated. Therefore, the temperatures of both the end portions of the grating can be decreased, a power consumption can be reduced.

Figure 9:
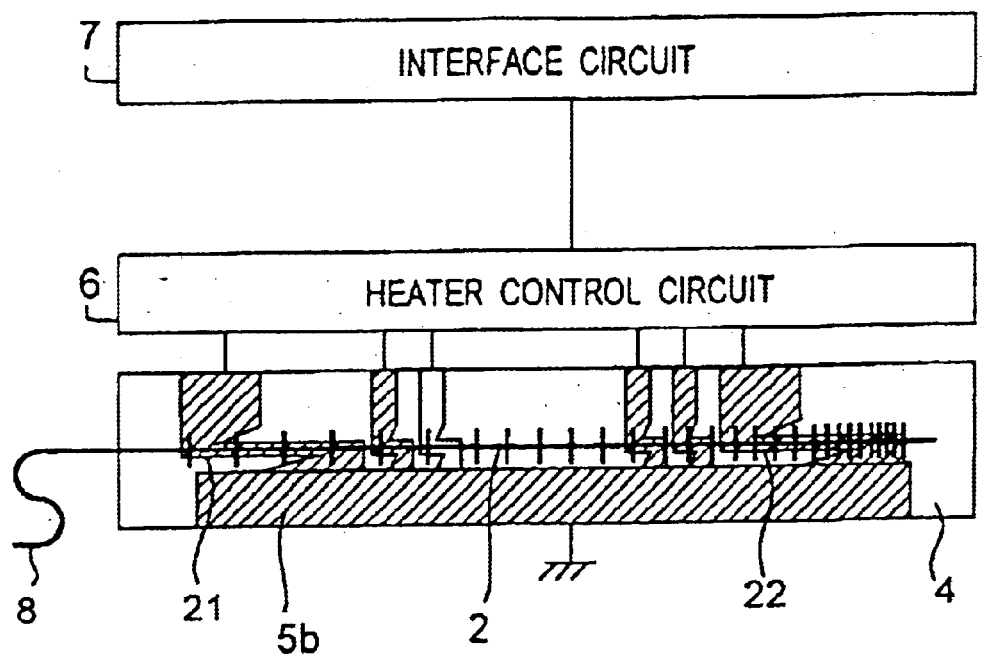
FIG. 9 is a diagram of the configuration of a variable dispersion compensator according to the third embodiment of the present invention.
Figure 10:
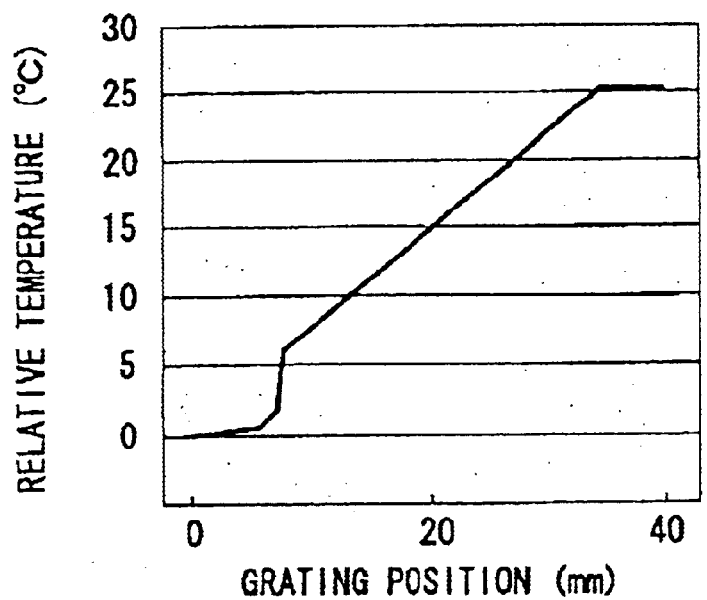
FIG. 10 is a graph of temperature distribution applied by a temperature controller of the variable dispersion compensator according to the third embodiment of the present invention.

A variable dispersion compensator according to the third embodiment of the present invention will be described below with reference to FIGS. 9 to 11. This variable dispersion compensator is different from the variable dispersion compensator according to the first embodiment in that, as shown in FIG. 9, heaters 21 and 22 are arranged near both the end portions of the chirped grating. More specifically, in a temperature controller of the variable dispersion compensator, as shown in FIG. 9, a plurality of heaters are arranged at the central portion of the chirped grating 2, and single heaters 21 and 22 are arranged at both the end portions of the chirped grating, respectively. In the variable dispersion compensator, as shown in FIG. 10, for example, temperature distribution, in which the temperature is changed as a linear function of a distance x, can be applied to the central portion of the grating 2 by the plurality of heaters. In addition, temperature distributions, in which the temperatures are almost constant, can be applied to both the end portions of the chirped grating 2 by the single heaters 21 and 22, respectively. In addition, the heaters 21 and 22 at both the end portions can be easily fabricated. Although the single heaters 21 and 22 are used for both the end portions here, a plurality of heaters may be used for each of both the end portions. In this case, a pitch at which the plurality of heaters at both the end portions may be larger than the pitch of the plurality of heaters arranged at the central portion.

FIG. 10 shows an example of temperature distribution applied to the chirped grating 2 by the temperature controller of the variable dispersion compensator. Temperature distribution, in which the temperature is changed as a linear function T(x) of the distance x, is applied to the central portion extending within the range of 20% to 80% of the length of 40 mm on the basis of the function T(x)=0.75x+D. On the other hand, both the end portions are defined as regions extending from both the ends of the grating and having lengths smaller than 20% of the length L of grating. Almost uniform temperature distribution is applied to the end portion on the high temperature side. In this case, the temperature at the portion extending from one end of the chirped grating and having a length which is 80% of the length L is set to almost equal to the temperature of at the portion having a length which is 100% of the length L of grating. At the end portion on the low temperature side, a power of the heater 21 is set to 0 W, as shown in FIG. 10. On the other hand, when air temperature exceeds the set temperature of the central portion, a power of the heater 22 at the end portion on the high temperature side is set to 0 W, as shown in FIG. 11.

Figure 11:
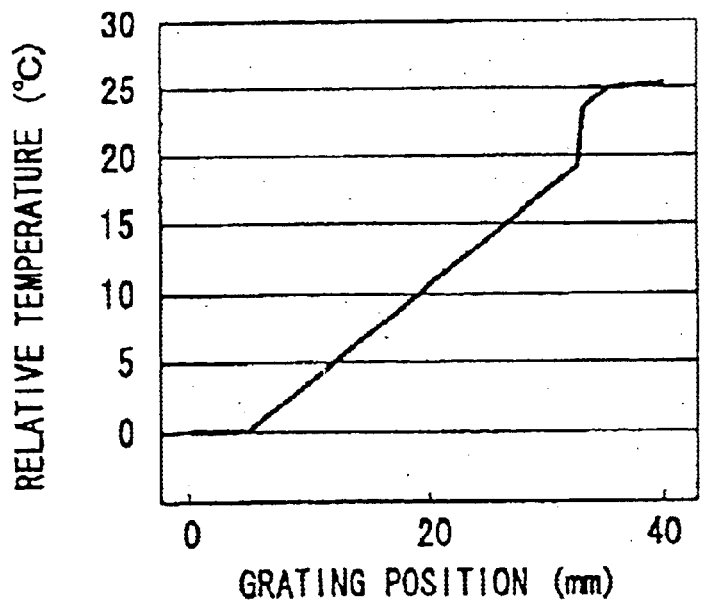
FIG. 11 is a graph of another temperature distribution applied by the temperature controller of the variable dispersion compensator according to the third embodiment of the present invention.

When the temperature distributions shown in FIGS. 10 and 11 are employed, the same effect as in the first embodiment can be obtained. More specifically, since the temperature at the end portion on the high temperature side or the end portion on the low temperature side can be considerably decreased, a power consumption of all the heaters in the temperature controller can be reduced by about 8%. When the single heaters 21 and 22 are employed, manufacturing the variable dispersion compensator can be simplified. The case in which the temperature distribution the temperature of which changes as a linear function is applied to the chirped grating 2 has been described above. However, the present invention is not limited to the case. For example, even though temperature distribution the temperature of which changes as a quadratic function of the distance x is applied to the chirped grating, power consumption can be similarly reduced by decreasing the temperatures at both the end portions.

In this case, the temperature distribution, in which the temperatures is almost constant, are applied to both the end portions of the grating 2. For this reason, temperature distribution having a predetermined inclination can be substantially applied to only the central portion of the grating 2. Therefore, temperature gradient at the central portion of the chirped grating 2 can be more increased, a variation in gradient of the group delay time can be increased.

Figure 12:
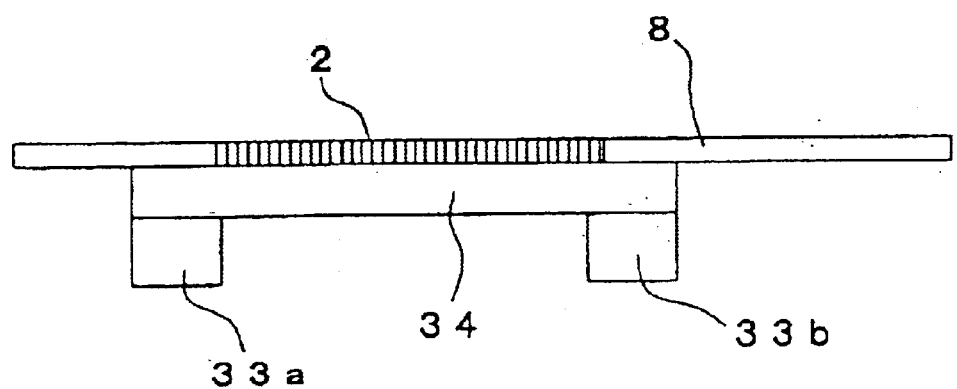
FIG. 12 is a schematic view of the configuration of a variable dispersion compensator according to the fourth embodiment of the present invention.
Figure 13:
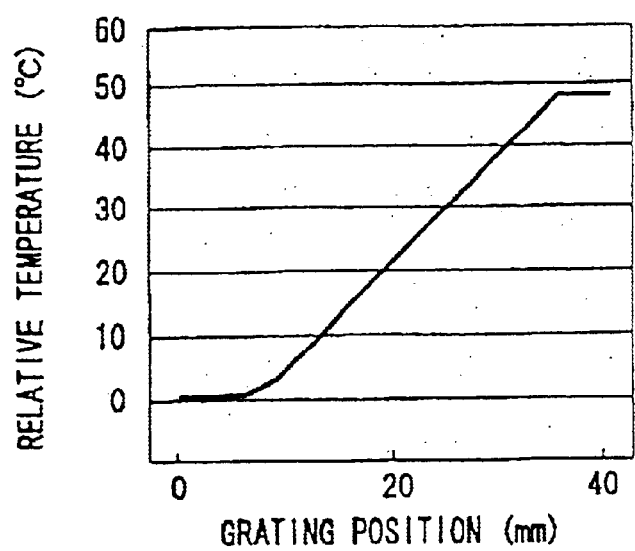
FIG. 13 is a graph of temperature distribution applied by a temperature controller of the variable dispersion compensator according to the fourth embodiment of the present invention.

A variable dispersion compensator according to the fourth embodiment of the present invention will be described below with reference to FIGS. 12 to 14. This variable dispersion compensator, as shown in the side view of FIG. 12, a chirped grating 2 is arranged on the first surface of a silicon substrate 34. Two Peltier devices 33a and 33b are arranged on a second surface of the silicon substrate 34 at an interval which is equal to length L of grating. The Peltier devices 33a and 33b are preferably arranged at an interval which is 60% or more of the length. The two Peltier devices 33a and 33b can indirectly apply temperature distribution to the chirped grating 2 by heat conduction from the rear surface of the silicon substrate 34. When the Peltier devices 33a and 33b are arranged at an interval which is 60% or more of the length L of grating, as shown in FIG. 13, a central portion is defined as the region where the distance x from one end of the chirped grating 2 is a range of 20% to 80% of the length L. Temperature distribution, in which the temperature is changed as a linear function of a distance x, can be applied to a central portion. As shown in FIG. 13, temperature distributions, in which the temperature is almost constant, can be applied to both the end portions of the chirped grating 2.

Figure 14A:
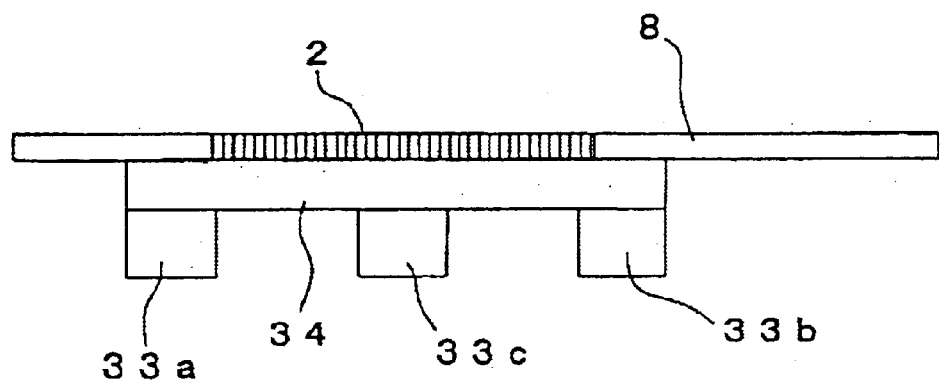
FIG. 14A is a schematic view of a variable dispersion compensator in which three Peltier devices are arranged.
Figure 14B:
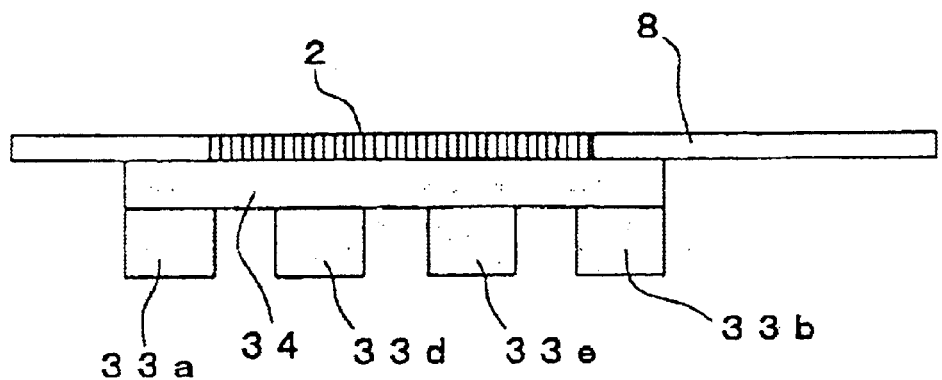
FIG. 14B is a schematic view of a variable dispersion compensator in which four Peltier devices are arranged.

A further exact configuration of the variable dispersion compensator will be described below. Of the two Peltier devices 33a and 33b, the Peltier device 33a on the low temperature side is set to 30° C., and the Peltier device 33b on the high temperature side is set to 80° C. The two Peltier devices 33a and 33b are arranged at an interval which is 60% or more of the length of 40 mm, i.e., 24 mm or more. The central portion of the chirped grating 2 in the longitudinal direction is adjusted to the center of the interval between the Peltier devices 33a and 33b. Contact portions between the silicon substrate 34 and the Peltier devices 33a and 33b have constant temperatures. On the other hand, since the heat conductivity of the silicon substrate 34 is good, a temperature is linearly changed at the central portion of the chirped grating 2. A shift from temperature obtained when the temperature is linearly changes in the whole region of the chirped grating 2 is a maximum of 12° C. In this time, the silicon substrate 34 is used. However, a substrate consisting of another material having good heat conductivity may be used. In this case, similarly, temperature distribution, in which the temperature is changed as a linear function of the distance x, can be applied. In addition, when a substrate consisting of a material having poor heat conductivity is used, temperature distribution, in which the temperature is changed as a quadratic function, can also be applied to the chirped grating 2. Furthermore, as shown in FIGS. 14A and 14B, in addition to the Peltier devices 33a and 33b at both the ends, Peltier devices 33c, 33d, and 33e are arranged at the center, so that temperature distribution, in which the temperature is changed as a quadratic function of the distance x, can also be applied to the grating 2.

As described above, the Peltier devices 33a and 33b are arranged on a second surface, i.e., the rear surface of the silicon substrate 34, and the temperature distribution shown in FIG. 13 is applied to the chirped grating 2, so that a power consumption in the variable dispersion compensator can be reduced. Since a heater and a heater electrode are not necessary, the variable dispersion compensator can be advantageously manufactured. As above described, temperature distribution, in which the temperature is changed as a linear function of the distance x, is applied to the chirped grating 2. However, the present invention is not limited to this case. For example, when temperature distribution, in which the temperature is changed as quadratic function of the distance x, is applied to the chirped grating, power consumption can be similarly reduced by decreasing the temperatures at both the end portions.

The temperature distribution, in which the temperatures is almost constant, is applied to both the end portions of the chirped grating 2. For this reason, temperature distribution having a predetermined inclination can be applied to only the central portion of the chirped grating 2. Therefore, temperature gradient at the central portion of the grating 2 can be made more large, a variation in gradient of the group delay time can be increased.

Figure 15:
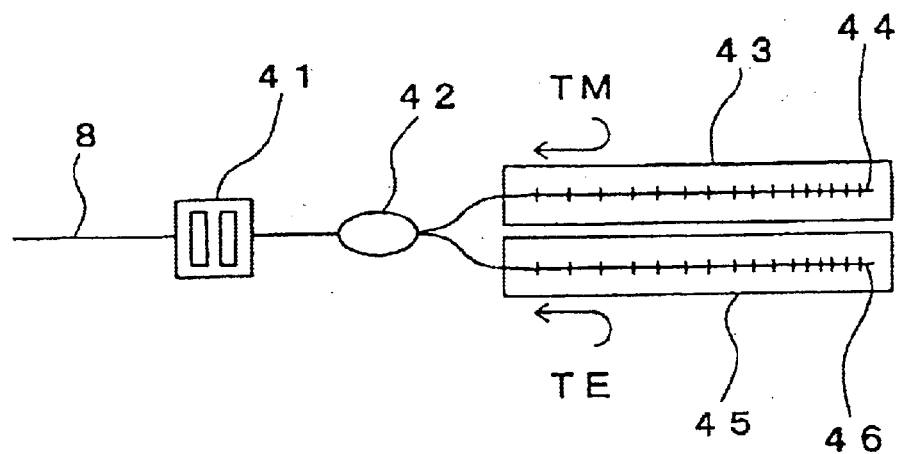
FIG. 15 is a diagram of the configuration of a polarization mode dispersion compensator according to the fifth embodiment of the present invention.
Figure 16:
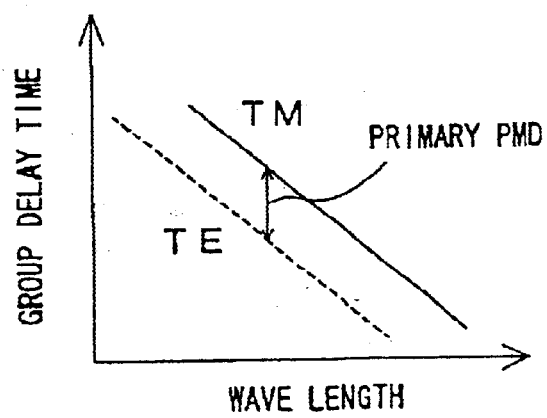
FIG. 16 is a graph of linear polarization mode dispersion existing between TM light component and TE light component of input light.

A polarization mode dispersion compensator which is one of variable dispersion compensator according to the fifth embodiment of the present invention will be described below with reference to FIGS. 15 to 18. FIG. 15 is a schematic view showing the configuration of the polarization mode dispersion compensator. This polarization mode dispersion compensator, as shown in FIG. 15, a polarization controller 41, a polarized wave separator/synthesizer 42, chirped gratings 44 and 46 for polarized light components, and temperature controllers 43 and 45. The respective components are connected to each other with an optical fiber 8. Functions of this polarization mode dispersion compensator will be described below. An input light is input to the polarization controller 41 first. In the polarization controller 41, the polarization axis of the input light is rotated by a control signal to be adjusted to the axis of the polarized wave separator/synthesizer 42. The input light is separated by the polarized wave separator/synthesizer 42 into a TM light component and a TE light component serving as linear polarized light components. These polarized light components are reflected by the chirped gratings 44 and 46 and then synthesized and output by the polarized wave separator/synthesizer 42. In this case, the temperatures of the chirped gratings 44 and 46 as wholes are set to be different temperatures by the temperature controllers 43 and 45, respectively to set a predetermined temperature difference. With this predetermined temperature difference, the center wavelengths of the temperature controllers 43 and 45 are shifted from each other. In this manner, for example, a linear polarization mode dispersion (PMD) in which a difference between the group delay characteristics of the TM light component and the group delay characteristics of the TE light component as shown in FIG. 16 is constant can be established. On the other hand, each polarized light component has a linear polarization mode dispersion as shown in FIG. 16, temperature distribution applied to the chirped gratings are controlled to shift the respective center wavelengths in opposite directions. In this manner, the polarization mode dispersion of the TM light component and the TE light component can be compensated. Therefore, the polarization mode dispersion can be controlled by the polarization mode dispersion compensator.

Figure 17:
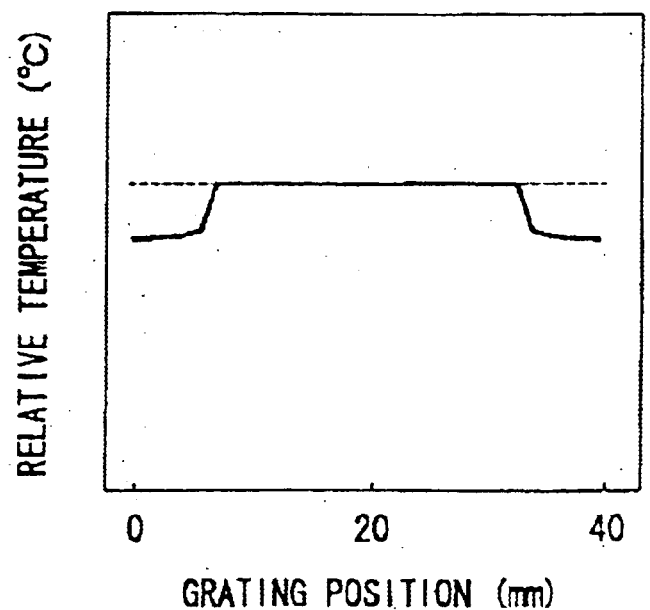
FIG. 17 is a graph of temperature distribution applied to one chirped grating when linear polarization mode dispersion is compensated by the polarization mode dispersion compensator according to the fifth embodiment of the present invention.

FIG. 17 is a graph showing an example of temperature distribution applied to the chirped gratings 44 and 46 by the temperature controllers 43 and 45 when the center wavelengths of the chirped gratings 44 and 46 are shifted. As shown in FIG. 17, different temperatures are set for the whole region of the chirped gratings 44 and 46 to set temperature difference, so that the reflective center wavelengths of the chirped gratings 44 and 46 can be shifted from each other. When the center wavelengths of respective polarized light components are shifted from each other, a linear polarization mode dispersion can be controlled. In this case, as indicated in a solid line in FIG. 17, in each chirped grating for polarized light component, temperature is uniformly increased or decreased at a central portion in which a distance from one end of a chirped grating is defined within the range of 20% to 80% of the length in the longitudinal direction, so that polarization mode dispersion can be controlled. Temperature at both the end portions defined as regions extending from both the ends of the grating and having a length which is not more than 20% of the grating length are set to lower than the temperature at the central portion. With this temperature distribution, the same effect as described above can be obtained, and power consumption can be reduced.

Figure 18:
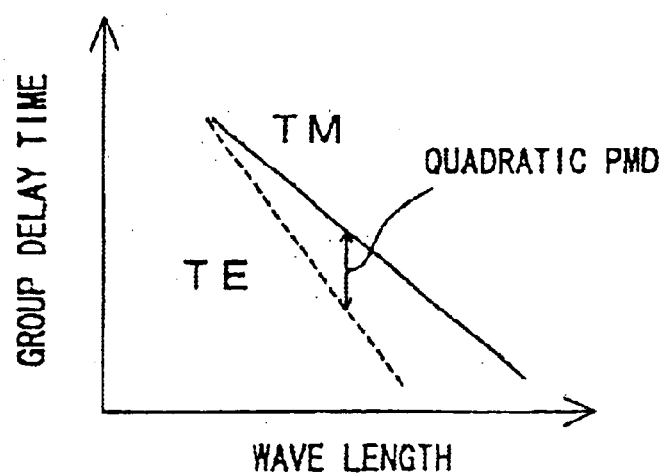
FIG. 18 is a graph of a secondary polarization mode dispersion existing between TM light component and TE light component of input light.

FIG. 18 is a graph showing a case in which the inclinations of the group delay time characteristics of TM light component and TE light component are different from each other with reference to wavelengths, i.e., the TM light component and the TE light component have a quadratic polarization mode dispersion. When this quadratic polarization mode dispersion is controlled, as in the above embodiment, the temperature gradient of temperature distribution applied to the chirped gratings 44 and 46 is controlled by the temperature controllers 43 and 45, so that the inclinations of the group delay time characteristics of the TM light component and the TE light component can be made equal to each other with reference to wavelengths. In this manner, quadratic polarization mode dispersion can be compensated.

In the variable dispersion compensator according to an aspect of the present invention, a central portion is defined as a region where distance from one end of the grating is a range of 20% to 80% of the length of grating, temperature distribution based on the first function $T_1(x)$ is applied to the central portion. Furthermore, temperature distributions based on the second and third functions $T_2(x)$ and $T_3(x)$ are applied to both the end portions defined as regions extending from both the ends of the grating and having lengths not more than 20% of the length of grating. At least one of the second and third functions $T_2(x)$ and $T_3(x)$ has distance dependence different from that of the first function $T_1(x)$. For example, the temperature at the end portion on the high temperature side can be controlled to lower temperature. In this case, eye opening penalty which is almost equal to that obtained when temperature distribution based on the same temperature distribution function is applied to the whole region of the chirped grating can be obtained. For this reason, power consumption can be reduced without changing eye opening penalty.

In the variable dispersion compensator according to another aspect of the present invention, temperature distribution based on the first function $T_1(x)$ is shifted ranging from ±2.5° C. to ±12° C. on at least one of both the end portions of the grating by the temperature controller. For this reason, eye opening penalty can be suppressed from being deteriorated, and power consumption can be advantageously reduced.

In the variable dispersion compensator according to still another aspect of the present invention, temperature at both positions where distances from one end of the chirped grating are 0% and 20% of the length along the longitudinal direction are controlled to be the same first temperature. Additionally, temperature at both positions where distances are 80% and 100% of the length are controlled to be the same second temperature. For this reason, temperature distribution having a predetermined inclination can be substantially applied to only the central portion of the chirped grating. Therefore, since temperature gradient at the central portion of the grating can be more increased, a variation in gradient of a group delay time can be increased.

The variable dispersion compensator according to still another aspect of the present invention further includes a plurality of first heaters spaced at first interval at the central portion of the grating. Furthermore, the variable dispersion compensator includes a plurality of second and third heaters spaced at second interval larger than the first interval at both the end portions. For this reason, the second and third heaters at both the end portions can be easily fabricated.

In the variable dispersion compensator according to still another aspect of the present invention includes a second heater and a third heater arranged at the both the end portions, respectively. For this reason, the second and third heaters at both the ends can be easily fabricated, and temperature distribution having almost constant temperature can be applied to both the end portions of the grating.

The variable dispersion compensator according to still another aspect of the present invention includes a substrate. The optical waveguide having the chirped grating is arranged on a first surface of the substrate, and a heater of the temperature controller is arranged on a second surface of the substrate. For this reason, temperature distribution can be indirectly applied from the rear surface of the substrate to the grating by heat conduction.

In the variable dispersion compensator according to still another aspect of the present invention, the temperature controller has two heaters arranged on the second surface of the substrate. Therefore, temperature distribution, in which the temperature is changed as a linear function of the distance x, can be applied to the chirped grating.

In the variable dispersion compensator according to still another aspect of the present invention, two heaters (e.g. Peltier devices) are spaced at an interval 60% or more of the length. For this reason, temperature distribution, in which the temperature is linearly changed, can be applied to the central portion. Furthermore, temperature distribution, in which the temperature is almost uniform, can be applied to both the end portions of the grating.

The variable dispersion compensator according to still another aspect of the present invention includes three heaters arranged on the second surface of the substrate. Since the heaters are arranged at not only both the ends but also the center as described above, temperature distribution, in which the temperature is changed as a quadratic function of the distance x, can be applied to the chirped grating.

The variable dispersion compensator according to still anther aspect of the present invention includes four heaters on the second surface of the substrate. When the plurality of heaters are arranged at not only both the ends but also the center as described above, temperature distribution, in which the temperature is changed as a quadratic function of the distance x, can be applied to the grating.

The variable dispersion compensator according to still another aspect of the present invention, the first function $T_1(x)$ is linear function or quadratic function of the distance x. For this reason, temperature distribution, in which the temperature is changed as the linear function or the quadratic function of the distance x, can be applied to the grating.

The polarization mode dispersion compensator according to an aspect of the present invention includes a polarized wave separator/synthesizer, chirped gratings for polarized light components, and a temperature controller. Input light is separated by the polarized wave separator/synthesizer into TM light component and TE light component serving as linear polarized light components. These polarized light components are reflected by the chirped gratings and then synthesized and output by the polarized wave separator/synthesizer. Temperature distribution based on the first and second functions $T_1(x)$ and $T_2(x)$ are applied to the chirped gratings by the temperature controller. The function $T_2(x)$ has distance dependence different from that of the function $T_1(x)$. For this reason, polarization mode dispersion which is a difference between group delay characteristics of the TM light component and group delay characteristics of the TE light component can be controlled.

In the polarization mode dispersion compensator according to another aspect of the present invention, a central portion is defined as the region where a distance from one end of the grating is a range of 20% to 80% of the length of the grating along the longitudinal direction. For example, with respect to one polarized light component, temperature distribution based on the first function $T_1(x)$ of the distance x is applied to the central portion. On the other hand, temperature distributions based on third and fourth functions $T_3(x)$ and $T_4(x)$ of the distance x are applied to both the end portions defined as regions extending from both the ends of the grating and having lengths which are not more than 20% of the length of grating. The third and fourth functions $T_3(x)$ and $T_4(x)$ have distance dependence different from that of the first function $T_1(x)$. For this reason, temperature can be decreased at the end portion on the high temperature side, and power consumption can be reduced.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A variable dispersion compensator comprising:
   an optical waveguide comprising a chirped grating having a Bragg wavelength changing along a longitudinal direction of the grating; and
   a temperature controller that controls the temperature of the grating, wherein temperature distribution having a first function $T_1(x)$ of a distance x is applied to a central portion of the grating, the central portion being defined as a region where the distance x from an end of the grating is a range of 20% to 80% of total length of the grating along the longitudinal direction, temperature distribution having second and third functions $T_2(x)$ and $T_3(x)$ of the distance x are applied to both end portions of the grating, the end portions being defined as two regions extending from respective ends of the grating to the central portion, and at least one of the second and third functions $T_2(x)$ and $T_3(x)$ has distance dependence different from that of the first function $T_1(x)$.

2. The variable dispersion compensator according to claim 1, wherein T2(x) and T3(x) have temperature distributions based on the first function $T_1(x)$, but shifted therefrom by a temperature in a range from ±2.5° C. to ±12° C.

3. The variable dispersion compensator according to claim 1, wherein T2(x) is constant at distances x from one end of the chirped grating that are 0% and 20% of the length of the grating along the longitudinal direction, and T3(x) is constant at distances x that are 80% and 100% of the length of the grating.

4. The variable dispersion compensator according to claim 1, wherein said temperature controller comprises:

a plurality of first heaters spaced at a first interval in the central portion; and a plurality of second and third heaters spaced at a second interval, larger than the first interval, at the end portions, respectively.

5. The variable dispersion compensator according to claim 1, wherein the temperature controller comprises:

a plurality of first heaters spaced at an interval in the central portion; and a second heater and a third heater located at the end portions, respectively.

6. The variable dispersion compensator according to claim 1, further including a substrate, wherein the optical waveguide having the chirped grating is located on a first surface of the substrate, and the temperature controller has a heater on a second surface of the substrate.

7. The variable dispersion compensator according to claim 6, wherein the temperature controller includes two heaters located at respective positions on the second surface of the substrate.

8. The variable dispersion compensator according to claim 7, wherein the two heaters are located at an interval not shorter than 60% of the length of the grating.

9. The variable dispersion compensator according to claim 6, wherein the temperature controller includes three heaters located at three respective positions on the second surface of the substrate.

10. The variable dispersion compensator according to claim 6, wherein the temperature controller includes at least four heaters located at four respective positions on the second surface of the substrate.

11. The variable dispersion compensator according to claim 1, wherein the first function $T_1(x)$ is a linear function of the distance x.

12. The variable dispersion compensator according to claim 1, wherein the first function $T_1(x)$ is a quadratic function of the distance x.

13. A polarization mode dispersion compensator comprising:

a polarized wave separator/synthesizer which separates light into first and second polarized light components and synthesizes the first and second polarized light components;

a first optical waveguide having a first chirped grating which receives the first polarized light component as an input light and having a Bragg wavelength changing along a longitudinal direction of the first chirped grating;

a first temperature controller which controls temperature of the first chirped grating;

a second optical waveguide having a second chirped grating which receives the second polarized light component as input light and having a Bragg wavelength changing along a longitudinal direction of the second chirped grating; and a second temperature controller which controls temperature of the second chirped grating, wherein temperature distributions having first and second functions $T_1(x)$ and $T_2(x)$ of the distance x are applied to central portions of the first and second gratings, the central portions defined as regions where the distance x from an end of the first and second gratings is a range of 20% to 80% of total length of the first and second gratings along the longitudinal directions thereof, respectively, and, the second function $T_2(x)$ has distance dependence different from that of the function $T_1(x)$.

14. A polarization mode dispersion compensator according to claim 13, wherein temperature distributions based on third and fourth functions $T_3(x)$ and $T_4(x)$ of the distance x are applied to both end portions of the first chirped grating, the end portions of the first chirped grating being defined as regions extending from ends of the first chirped grazing and having lengths not more than 20% of the length of the first chirped grating, respectively, at least one of the third and fourth functions $T_3(x)$ and $T_4(x)$ has a distance dependence different from that of the first function $T_1(x)$, temperature distributions having fifth and sixth functions $T_5(x)$ and $T_6(x)$ of the distance x are applied to both end portions of the second chirped grating, the end portions of the second chirped granting being defined as regions extending from ends of the second chirped grating and having lengths not more than 20% of the length of the second chirped grating, respectively, and at least one of the fifth and sixth functions $T_5(x)$ and $T_6(x)$ has a distance dependence different from that of the second function $T_2(x)$.

* * * * *